(12) United States Patent
Choi et al.

(10) Patent No.: US 8,120,275 B2
(45) Date of Patent: Feb. 21, 2012

(54) INVERTER AND LAMP DRIVER INCLUDING THE SAME

(75) Inventors: Jae-Soon Choi, Seoul (KR); Dong-Hun Lee, Bucheon (KR); Hak-Hee Lee, Bucheon (KR)

(73) Assignee: Fairchild Korea Semiconductor Ltd. (KR)

( * ) Notice: Subject to any disclaimer, the term of this patent is extended or adjusted under 35 U.S.C. 154(b) by 415 days.

(21) Appl. No.: 12/510,511

(22) Filed: Jul. 28, 2009

(65) Prior Publication Data

US 2010/0019688 A1 Jan. 28, 2010

(30) Foreign Application Priority Data

Jul. 28, 2008 (KR) ........................ 10-2008-0073654

(51) Int. Cl.
*G05F 1/00* (2006.01)
*H05B 37/02* (2006.01)
*H05B 39/04* (2006.01)
*H05B 41/36* (2006.01)

(52) U.S. Cl. .................... 315/291; 315/209 R; 315/212; 315/219; 315/307

(58) Field of Classification Search .................. None
See application file for complete search history.

(56) References Cited

U.S. PATENT DOCUMENTS

| 5,615,093 | A | 3/1997 | Nalbant | |
|---|---|---|---|---|
| 7,120,035 | B2 | 10/2006 | Lin et al. | |
| 7,161,305 | B2 | 1/2007 | Chen | |
| 7,200,012 | B1 * | 4/2007 | Hsu | 363/17 |
| 7,426,124 | B2 * | 9/2008 | Kong et al. | 363/98 |
| 7,515,446 | B2 * | 4/2009 | Lin | 363/98 |

FOREIGN PATENT DOCUMENTS

| JP | 2004-015928 A | 1/2004 |
|---|---|---|
| KR | 10-2006-0037058 A | 5/2006 |

* cited by examiner

*Primary Examiner* — Anh Tran
(74) *Attorney, Agent, or Firm* — Alston & Bird LLP

(57) ABSTRACT

The present invention relates to an inverter and a lamp driver having the same. The inverter includes a first switch having a first body diode, a second switch having a second body diode, a transformer including a first side coil in which a first current and a first voltage are generated according to switching operations of the first switch and the second switch and a second side coil having a predetermined winding ratio with respect to the first side coil, and a controller for controlling each switching operation of the first switch and the second switch. The controller turns on one of the first switch and the second switch corresponding to one of the first body diode and the second body diode, and a current flows through the first switch and the second switch during a dead time.

20 Claims, 6 Drawing Sheets

INVERTER AND LAMP DRIVER INCLUDING THE SAME

CROSS-REFERENCE TO RELATED APPLICATION

This application claims priority to and the benefit of Korean Patent Application No. 10-2008-0073654 filed in the Korean Intellectual Property Office on Jul. 28, 2008, the entire contents of which are incorporated herein by reference.

BACKGROUND OF THE INVENTION (a) Field of the Invention

The present invention relates to an inverter and a lamp driver having the same. More particularly, the present invention relates to a configuration for controlling switching of an inverter switch.

(b) Description of the Related Art

An inverter transforms a DC voltage (current) into an AC voltage (current). The inverter is a DC-AC power transformer in which an average input power is transmitted from a DC side to an AC side. Types of invertors include a full-bridge inverter, a half-bridge inverter, and a push-pull inverter. They are distinguished according to an operation for transforming a DC voltage (current) into an AC voltage (current). The full-bridge inverter uses four switch elements, and the half-bridge inverter and the push-pull inverter use two switch elements. For the half-bridge inverter and the push-pull inverter, when two switches are turned off, each body diode of two switches are alternately turned on and a current flows through the turned-on body diode. A voltage drop at both terminals of the turned-on body diode is generated. Power consumption is generated by the current flowing through the turned-on body diode and the voltage drop at both terminals of the turned-on body diode.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an inverter that can reduce power consumption when a body diode of a switch element is turned on, and a lamp driver having the same.

An inverter according to an exemplary embodiment of the present invention includes a first switch having a first body diode, a second switch having a second body diode, a transformer including a first side coil in which a first current and a first voltage are generated according to switching operations of the first switch and the second switch and a second side coil having a predetermined winding ratio with respect to the first side coil, and a controller for controlling each switching operation of the first switch and the second switch. The controller turns on one of the first switch and the second switch corresponding to one of the first body diode and the second body diode, and a current flows through the first switch and the second switch during a dead time.

The inverter further includes a capacitor including a first terminal coupled to the first side coil and a grounded second terminal. A first terminal of the first switch is coupled to a first terminal of the second switch, an input voltage is input to a second terminal of the first switch, and a first terminal of the first side coil is coupled to a node connected with the first switch and the second switch. The inverter further includes a current sensor coupled to the first terminal of the first side coil.

The controller includes an oscillator, an error compensator, and a driving controller. The oscillator generates a sawtooth wave signal having a predetermined period. The error compensator receives a feedback voltage corresponding to output power generated according to a voltage and a current inducted to the second side coil, compares the feedback voltage with a reference signal, and generates an error amplification signal according the comparing result. The driving controller controls switching operation of the first switch and the second switch by using the sawtooth wave signal, a current flowing through the first side coil, and the error amplification signal. The error compensator includes an error amplifier having an inversion terminal receiving the feedback voltage and a non-inversion terminal receiving the reference signal, and a capacitor of which both terminals are respectively coupled with an output terminal of the error amplifier and the inversion terminal.

The driving controller turns on the first switch when a current flowing through the first side coil flows through the first body diode during the dead time, and turns on the second switch when the current flowing through the first side coil flows through the second body diode during the dead time. The driving controller turns on one of the first switch and the second switch at a time that is delayed by a predetermined period from a time when the sawtooth wave signal begins to increase, and turns off the turned-on switch at a first time when the sawtooth wave signal increases to the error amplification signal. The driving controller turns on the second switch during a period when the sawtooth wave signal is larger than the error amplification signal and the current flowing through the first side coil is larger than a first threshold value, and turns on the first switch during a period when the sawtooth wave signal is larger than the error amplification signal and the current flowing through the first side coil is less than a second threshold value. The first threshold value is a positive value near 0, and the second threshold value is a negative value near 0.

An inverter according to another exemplary embodiment of the present invention includes a first switch having a first body diode, a second switch having a second body diode, a transformer including a first side coil in which a first current and a first voltage are generated according to switching operations of the first switch and the second switch and a second side coil having a predetermined winding ratio with respect to the first side coil, and a controller for controlling each switching operation of the first switch and the second switch. The controller turns on one of the first switch and the second switch corresponding to one of the first body diode and the second body diode, and a current flows through the first switch and the second switch during a dead time. A first terminal of the first switch is coupled to the first side coil, a first terminal of the second switch to a second terminal of the first side coil, and an input voltage is applied to any one of node between the first side coils.

The inverter further includes a first current sensor coupled to the second terminal of the first switch and a second current sensor coupled to the second terminal of the second switch. The controller includes an oscillator, an error compensator, and a driving controller. The oscillator generates a sawtooth wave signal having a predetermined period. The error compensator receives a feedback voltage corresponding to output power generated according to a voltage and a current inducted to the second side coil, compares the feedback voltage with a reference signal, and generates an error amplification signal according the comparing result. The driving controller controls a switching operation of the first switch and the second switch by using the sawtooth wave signal, the current flowing through the first body diode, the current flowing through the second body diode, and the error amplification signal. The driving controller turns on the first switch when the current flows through the first body diode during the dead time, and turns on the second switch when the current flows through the second body diode during the dead time. The driving controller turns on one of the first switch and the second switch at a time that is delayed by a predetermined period from a time when the sawtooth wave signal begins to increase, and turns off the turned-on switch at a first time when the sawtooth wave signal increases to the error amplification signal. The driving controller turns on the first switch during a period when the sawtooth wave signal is larger than the error amplification signal and an absolute value of the current flowing through the first body diode is larger than a threshold value. The driving controller turns on the second switch during a period when the sawtooth wave signal is larger than the error amplification signal and an absolute value the current flowing through the second body diode is larger than the threshold value. The threshold value is a positive value near 0.

A lamp driver according to another exemplary embodiment of the present invention supplies an output voltage and an output current to discharge lamps. The lamp driver includes a first switch having a first body diode, a second switch having a second body diode, a transformer including a first side coil generating a first current and a first voltage according to switching operations of the first switch and the second switch and a second side coil having a predetermined winding ratio with respect to the first side coil, and a controller for controlling each switching operation of the first switch and the second switch. The controller turns on one of the first switch and the second switch corresponding to one of the first body diode and the second body diode, and a current flows through the first switch and the second switch during a dead time. The lamp driver supplies an output voltage and an output current respectively corresponding to a voltage and a current inducted to the second side coil to a plurality of the discharge lamps. The controller receives a plurality of feedback voltages corresponding to the output currents supplied to the plurality of discharge lamps and a current flowing through the first and second body diodes, and controls the switching operations of the first switch and the second switch by using a sawtooth wave signal having a predetermined period, the plurality of feedback voltages, and the current. The controller includes an oscillator for generating the sawtooth wave signal, a current detector for rectifying the plurality of feedback voltages and detecting a maximum value of rectified first feedback voltages, an error compensator for comparing the maximum value and a predetermined reference signal and generating an error amplification signal according to the comparison result, and a driving controller for controlling the switching operation of the first switch and the second switch by using the sawtooth wave signal, the flowing current, and the error amplification signal. The error compensator includes an error amplifier having an inversion terminal receiving the maximum value and a non-inversion terminal receiving the reference signal, and a capacitor of which terminals are respectively coupled with an output terminal of the error amplifier and the inversion terminal.

As describe above, according to an aspect of the present invention, the present invention provides an inverter for decreasing power consumption incurred by a body diode of a turned-on switch, and a lamp driver including the same.

DETAILED DESCRIPTION OF THE EMBODIMENTS

Figure 1:
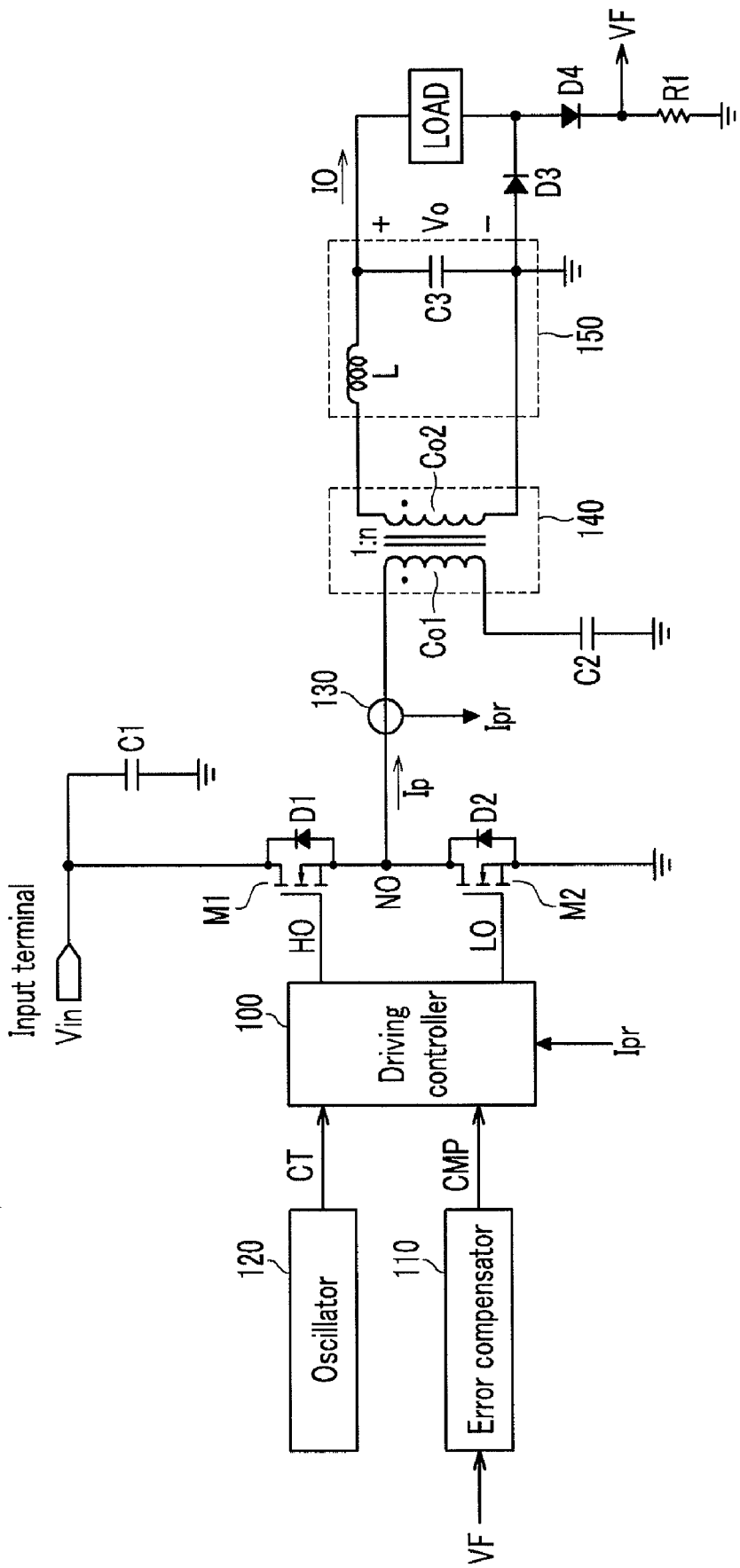
FIG. 1 shows an inverter according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 shows an inverter according to an exemplary embodiment of the present invention. As shown in FIG. 1, an inverter includes a driving controller 100, an error compensator 110, an oscillator 120, a current sensor 130, a transformer 140, an LC resonant tank 150, a high side switch M1, a low side switch M2, and capacitors C1 and C2.

According to an exemplary embodiment of the present invention, the high side switch M1 and the low side switch M2 of the inverter are realized as an n-channel metal-oxide semiconductor field-effect transistors (NMOSFET). The high side switch M1 and the low side switch M2 respectively include a body diode D1 and a body diode D2. In addition, the high side switch M1 and the low side switch M2 respectively include a drain electrode as a first electrode, a source electrode as a second electrode, and a gate electrode as a control electrode. The capacitor C1 filters a noise element of an input voltage Vin.

The LC resonant tank 150 includes a leakage inductance L of the transformer 140 and a capacitor C3. The capacitor C3 includes a parasitic capacitance of the transformer 140. The LC resonant tank 150 receives a voltage between two terminals of a second side coil Co2 and a current flowing through the second side coil Co2, and generates an output voltage VO and an output current IO near a sine wave. The high side switch M1 includes the drain electrode coupled to an input terminal and the source electrode coupled to the drain electrode of the low side switch M2. The input voltage Vin is input to the drain electrode. A node NO connected with the high side switch M1 and the low side switch M2 is coupled to the transformer 140. The control electrode of the high side switch M1 is coupled to the driving controller 100.

A gate control signal HO transmitted from the driving controller 100 alternately has a high level and a low level. The high level is sufficient to turn on the high side switch M1 and the low level is sufficient to turn off the high side switch M1. The source electrode of the low side switch M2 is grounded. The gate electrode of the low side switch M2 is coupled to the driving controller 100. A gate control signal LO transmitted from the driving controller 100 has a high level and a low level alternately. The high level is sufficient to turn on the low side switch M2 and the low level is sufficient to turn off the low side switch M2.

A first terminal of a first side coil Co1 of the transformer 140 is coupled to the node NO and a second terminal of the first side coil Co1 is coupled to a first terminal of the capacitor C2. A second terminal of the capacitor C2 is grounded. According to a winding ratio 1:n between the first side coil Co1 and the second side coil Co2 of the transformer 140, a voltage between two terminals of the first side coil Co1 is transmitted to two terminals of the second side coil Co2. According to an inverse winding ratio, a current flowing through the coil Co1 is transmitted to the second side coil Co2.

A voltage applied to the second side coil Co2 and a current flowing the second side coil Co2 are generated as the output voltage VO and the output current IO through the LC resonant tank 150. The generated output voltage VO and the output current IO are supplied to a LOAD. A diode D4 rectifies a current flowing through the LOAD, and a voltage generated when the rectified current flows through a resistor R1 is a feedback voltage VF. As the feedback voltage VF is information about output power of the inverter, the driving controller 100 determines duties of the high side switch M1 and the low side switch M2 by using the feedback voltage VF. The output current IO flows through a diode D3 when the output current IO is supplied to the LOAD in a negative direction (i.e., opposite direction to arrow of the output current IO shown in FIG. 1).

The current sensor 130 senses a current Ip flowing through the first side coil Co1 of the transformer 140. The current sensor 130 senses the current Ip, generates a detection signal Ipr corresponding to the current Ip, and transmits the detection signal Ipr to the driving controller 100.

The oscillator 120 generates and outputs a sawtooth wave signal having a predetermined period. In this time, the predetermined period determines each switching period of the high side switch M1 and the low side switch M2. The inverter operates as a half-bridge type, and each of the high side switch M1 and the low side switch M2 are switched according to a period that is twice that of the predetermined period.

The error compensator 110 receives a feedback voltage VF, generates an average voltage of the feedback voltage VF, compares the average voltage and a reference signal having a predetermined level, amplifies the difference between them, and generates an error amplification signal CMP. The inverter determines duties of the high side switch M1 and the low side switch M2 by using the error amplification signal CMP and the sawtooth wave signal CT. Accordingly, the reference signal is changed, and then the duties of the high side switch M1 and the low side switch M2 are changed.

The driving controller 100 compares the sawtooth wave signal CT and the error amplification signal CMP, and generates the gate control signal HO of the high side switch M1 and the gate control signal LO of the low side switch M2. Each switching period and each duty of the high side switch M1 and the low side switch M2 are the same. The driving controller 100 alternately turns on the high side switch M1 and the low side switch M2 and controls to not incur a period when the high side switch M1 and the low side switch M2 are simultaneously turned on.

A dead time when the high side switch and the low side switch are turned off between the period when the high side switch M1 is turned on and the period when the low side switch M2 is turned on is needed. However, in the present invention, the high side switch and the low side switch are alternately turned on for a period when a current flows through the body diodes of the high side switch and the low side switch during the dead time.

The driving controller 100 senses a current flowing through one of the body diodes D1 and D2 for the dead time by using the sawtooth wave signal CT, the error amplification signal CMP, and the detection signal Ipr. The driving controller 100 turns on one of the high side switch M1 and the low side switch M2 for the predetermined period. The turned-on switch corresponds to one of the body diodes D1 and D2 through which the current flows. The driving controller 100 turns on the high side switch M1 when the driving controller 100 senses the current flowing through the body diode D1 for the dead time. When the current flowing through the high side switch M1 is decreased and is near zero, the driving controller 100 turns off the high side switch M1. The driving controller 100 turns on the low side switch M2 when the driving controller 100 senses the current flowing through the body diode D2 for the dead time.

Figure 2:
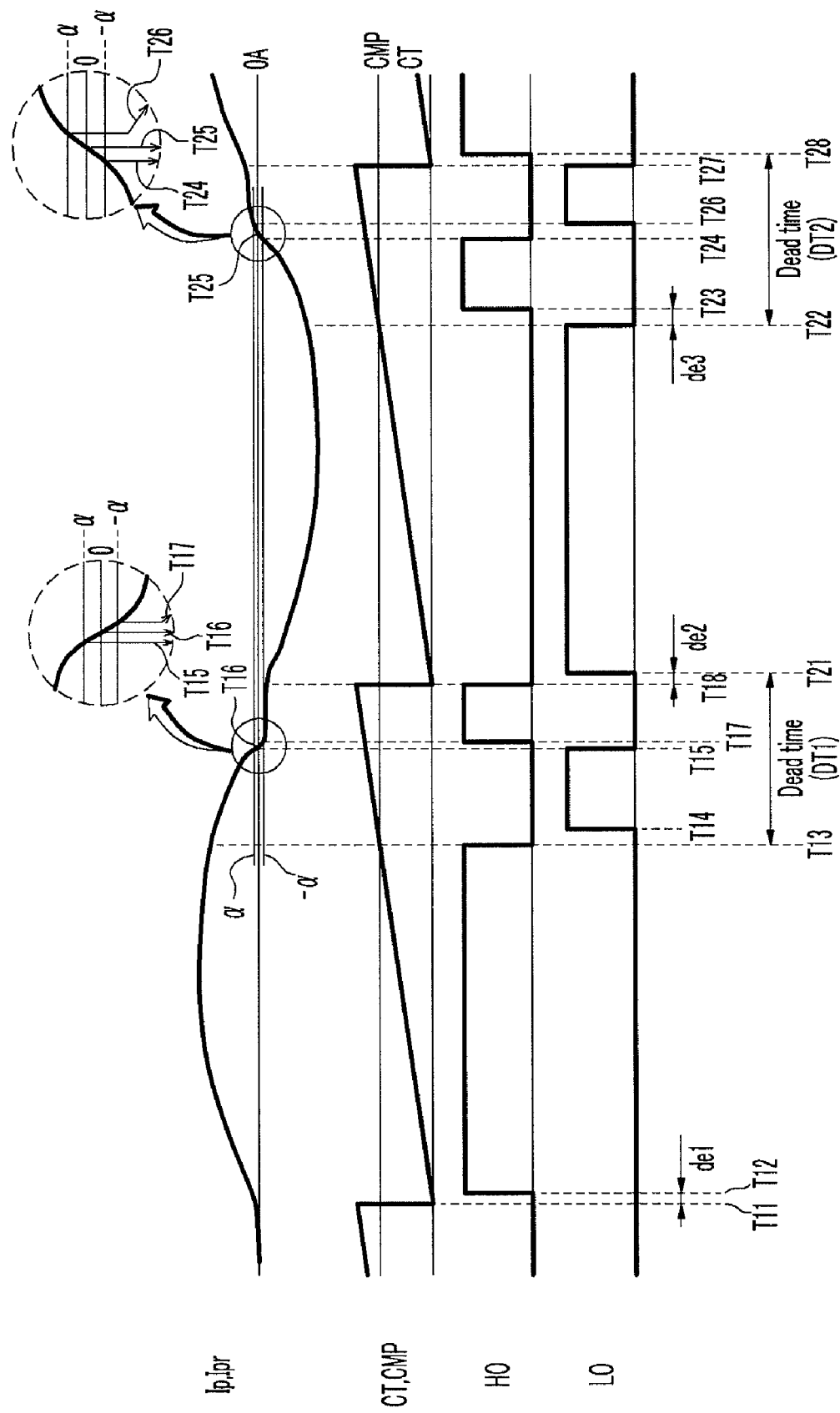
FIG. 2 shows currents and signals flowing through the inverter according to an exemplary embodiment of the present invention.

When the current flowing through the low side switch M2 is decreased and is near zero, the controller 100 turns off the low side switch M2. The driving controller 100 can set the dead time by using the sawtooth wave signal CT and the error amplification signal CMP. In detail, the dead time can be set by adding a predetermined delay period to a period when the sawtooth wave signal CT is larger than the error amplification signal CMP. Referring to FIG. 2, an operation of the inverter according to an exemplary embodiment of the present invention will be described in detail.

FIG. 2 shows the current Ip flowing through the first side coil Co1, the sawtooth wave signal CT, the error amplification signal CMP, the high side switch gate control signal HO, and the low side switch gate control signal LO according to an exemplary embodiment of the present invention. According to an exemplary embodiment of the present invention, the current sensor 130 senses the current Ip of the first side coil and generates the detection signal Ipr, which is same as the sensed current Ip. In addition, the resonance between the capacitor C2 and the first side coil Co1 occurs and the current Ip of the first side coil Co1 is a sine wave because of the resonance.

First, at time T11, the sawtooth wave signal CT is less than the error amplification signal CMP, and the driving controller 100 senses this. The driving controller 100 generates the gate control signal HO to turn on the high side switch M1 at time T12 after a predetermined delay period de1 from the time T11.

At the time T12, the gate control signal HO becomes a high level and the high side switch M1 is turned on. Then, for T12-T13 when the high side switch M1 is turned on, the current Ip flows through the path configured with the input terminal, the first side coil Co1, and the capacitor C2. At time T13, the sawtooth wave signal CT reaches the error amplification signal CMP. At the time T13, the driving controller 100 senses this, and generates a low level gate control signal HO. Then, the high side switch M1 is turned off.

After the time T13, since a flowing direction of the current is maintained even though the high side switch M1 is turned off, the body diode D2 of the low side switch M2 is turned on and the current Ip flows along the path configured with the body diode D2, the first side coil Co1, and the capacitor C2. The driving controller 100 senses that the current Ip flows through the body diode D2. The driving controller 100 changes the gate control signal LO to become a high level, and outputs the gate control signal LO at time T14. Then, the low side switch M2 is turned on. In this time, during the period from the time T13 when the high side switch M1 is turned off to the time T14 when the low side switch M2 is turned on, the body diode D2 is turned on. Then, since a voltage difference between the drain electrode and the source electrode of the low side switch M2 is very small during the period T13-T14, the low side switch M2 substantially operates zero voltage switching at the time T14.

At time T15, when the decreased current Ip is near 0A, the low side switch M2 is turned off and the low side switch M2 substantially operates zero current switching. The driving controller 100 maintains the low side switch M2 in the turned-on state during a period when meeting a condition 1).

The condition 1) is "error amplification signal CMP<sawtooth wave signal CT and first side coil current Ip>positive threshold value $\alpha$". In the condition 1), the positive threshold value a is a margin value to sense if the current Ip reaches 0, and the positive threshold value $\alpha$ is near 0. The period T13-T14 meets the condition 1). However, the period T13-T14 is needed for the zero voltage switching of the low side switch M2. Therefore, the driving controller 100 can delay the turning-on of the low side switch M2 by the period T13-T14.

The flowing direction of the current Ip changes for a very short interval. At time T16, the current Ip changes from the direction flowing into the first side coil Co1 (hereinafter, "forward direction") to the direction flowing from the first side coil Co1 (hereinafter, "reverse direction"). After the flowing direction of the current Ip changes to the reverse direction, the current Ip flows through the body diode D1. If the low side switch M2 maintains to be turned on after the flowing direction of the current Ip changes (after the time T16 shown in FIG. 2), some of the current Ip can flow through the low side switch M2 instead of the body diode D1. To prevent this, the driving controller 100 turns off the low side switch M2 by using the positive threshold value CL before the time T16 when the flowing direction of the current Ip changes.

After the time T16, the current Ip flows along the path configured with the capacitor C2, the first side coil Co1, and the body diode D1. After the driving controller 100 senses that the current flows through the body diode D1, the driving controller 100 changes the gate control signal HO to a high level, and outputs the high level gate control signal HO at time T17 when the current Ip reaches to a negative threshold value $-\alpha$. Then, the high side switch M1 is turned on and the current flowing through the body diode D1 flows through the turned-on high side switch M1. In this time, during the period from the time T16 to the time T17, the body diode D1 is turned on.

The high side switch M1 is turned off at time T18 when the sawtooth wave signal CT is less than the error amplification signal CMP. In detail, the driving controller 100 maintains the high side switch M1 in the turned-on state during a period when meeting a condition 2) in the dead time.

The condition 2) is "error amplification signal CMP<sawtooth wave signal CT and first side coil current Ip<negative threshold value $-\alpha$". During the period T16-T17 when the current flows through the body diode D1, a voltage difference between the drain electrode and the source electrode of the high side switch M1 is very small. At the time T17, the high side switch M1 is turned on, so the high side switch M1 substantially operates zero voltage switching. In the condition 2), the negative threshold value $-\alpha$ is a margin for a zero voltage operation. Before time T21 when the low side switch M2 is turned on, since the reduction of the current Ip is very small, the current Ip is a negative value substantially near "0" at the time T18. Accordingly, at the time T18, the high side switch M1 substantially operates zero current switching.

At the time T18, the sawtooth wave signal CT is less than the error amplification signal CMP, the driving controller 100 senses this, and the driving controller 100 generates the gate control signal LO to turn on the low side switch M2 after a predetermined delay period de2 from the time T18. At the time 21, the gate control signal LO becomes a high level and the low side switch M2 is turned on. Then, while the low side switch M2 is turned on, the current Ip increases and flows in the reverse direction.

At time T22, the sawtooth wave signal CT reaches the error amplification signal CMP, the driving controller 100 senses this, and the driving controller 100 generates a low level gate control signal LO. Then, the low side switch M2 is turned off. At the time T22, since the reverse direction in which the current Ip flows is maintained even though the low side switch M2 is turned off, the body diode D1 of the high side switch M1 is turned on and the current Ip flows along the path configured with the body diode D1, the first side coil Co1, and the capacitor C2 in the reverse direction. The driving controller 100 senses that the current Ip flows through the body diode D1 after the time T22. At time T23, the driving controller 100 changes the gate control signal HO to become a high level and outputs the high level gate control signal HO. Then, the high side switch M1 is turned on at time T23. The current Ip flows through the turned-on high side switch M1 instead of the body diode D1 after the time T23.

The voltage difference between the drain electrode and the source electrode of the high side switch M1 is very small by the turned-on body diode D1 at the time T23. Therefore, the high side switch M1 substantially operates zero voltage switching at the time T23. At time T24, when an absolute value of the current Ip is reduced and is $-\alpha$, the high side switch M1 is turned off. Therefore, the high side switch M1 substantially operates zero current switching.

During a period meeting condition 2) in the dead time DT2, the driving controller 100 maintains the high side switch M1 in the turned-on state. Although the period de3 meets the condition 2), the period de3 is needed for the zero voltage switching operation of the high side switch M1. Therefore, the driving controller 100 delays the turning-on of the high side switch M1 during the period de3. After time T25, the current Ip flows along the path configured with the capacitor C2, the first side coil Co1, and the body diode D2.

The driving controller 100 senses that the current Ip flows through the body diode D2 after time T25. The driving controller 100 changes the gate control signal LO to become a high level and outputs the high level gate control signal LO at time T26 when the current Ip reaches the positive threshold value $\alpha$. Then, the low side switch M2 is turned on and the current Ip flows through the turned-on low side switch M2 instead of the body diode D2. The low side switch M2 is turned off at time T27 when the sawtooth wave signal CT is less than the error amplification signal CMP.

During a period meeting the condition 1) in the dead time DT2, the driving controller 100 maintains the low side switch M2 in the turned-on state. The voltage difference between the drain electrode and the source electrode of the low side switch M2 is very small by the turned-in body diode D2 at the time T26. The low side switch M2 substantially operates the zero voltage switching at the time T26. In the condition 1), the positive threshold value a is a margin for the zero voltage operation. Before time T28 when the high side switch M1 is turned on, the current Ip is very small, and the current Ip is substantially near 0 at the time T27. Accordingly, at the time T27, the low side switch M2 operates the zero current switching.

As described above, if a current flows through a turned-on body diode of the body diodes D1 and D2, one of the high side switch M1 and the low side switch M2 coupled to the turned-on body diode is turned on. Accordingly, the current begins to flow through the turned-on switch instead of the turned-on body diode. Therefore, power consumption occurring from the turned-on body diode can be reduced.

To reduce a switching loss caused by each switching operation of the high side switch M1 and the low side switch M2, the high side switch M1 and the low side switch M2 respectively operate according to zero voltage switching in the turned-on state and zero current switching in the turned-off state. Therefore, the inverter of the half-bridge type according to an exemplary embodiment of the present invention minimizes the switching loss caused by switching operations for reducing power consumption occurring from the body diode.

Figure 3:
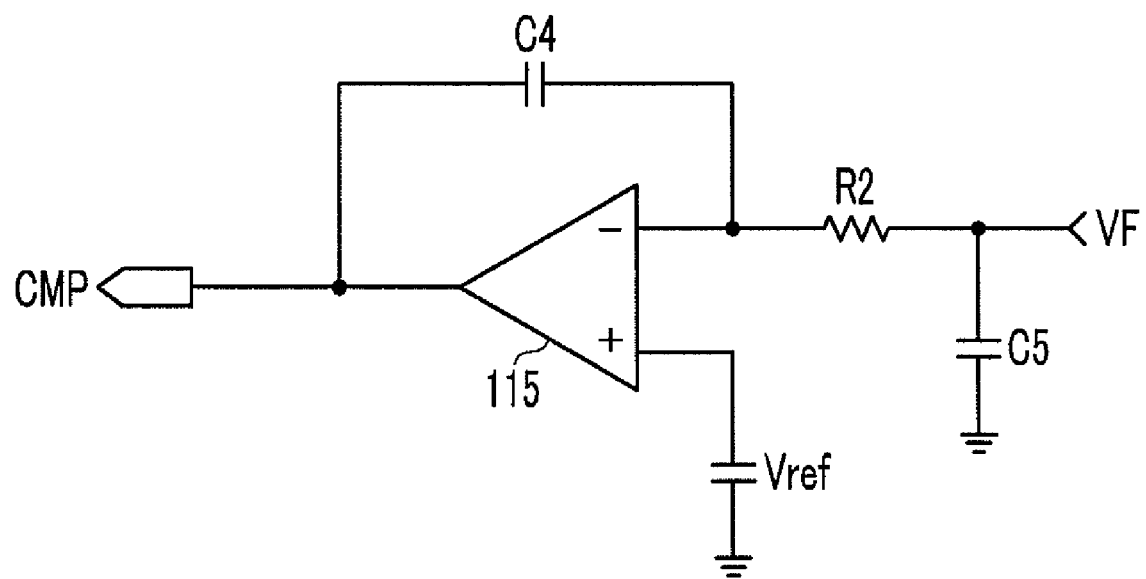
FIG. 3 shows an error compensator according to an exemplary embodiment of the present invention.

FIG. 3 shows a detailed error compensator according to an exemplary embodiment of the present invention. As shown in FIG. 3, the error compensator 110 includes an error amplifier 115, a capacitor C4, a capacitor C5, a resistor R2, and a voltage source Vref generating a reference voltage. The resistor R2 and the capacitor C5 remove a noise element of the feedback voltage VF input to the inversion terminal of the error amplifier 115. The capacitor C4 is coupled to an output terminal and the inversion terminal of the error amplifier 115, and generates an average voltage of the feedback voltage VF. The average voltage of the feedback voltage VF is input to the inversion terminal of the error amplifier 115. The voltage source Vref applies the reference voltage to a non-inversion terminal of the error amplifier 115

In detail, when the average voltage of the feedback voltage VF is less than the reference voltage, the error amplification signal CMP is increased. Then, a period when the sawtooth wave CT reaches the error amplification signal CMP is increased, and the duties of the high side switch M1 and the low side switch M2 are increased. When the duties are increased, the output voltage VO is increased and the feedback signal VF is increased. When the feedback signal VF is increased, the average voltage of the feedback voltage VF is increased, and the error amplification signal CMP is reduced. Then, a period when the sawtooth wave CT reaches the error amplification signal CMP is reduced, and the duties of the high side switch M1 and the low side switch M2 are reduced. When the duties are reduced, the output voltage VO is reduced and the feedback signal VF is reduced.

As described above, the duties of the high side switch M1 and the low side switch M2 are determined according to the error amplification signal CMP and the output voltage VO is controlled according to the duties. As a result, the output voltage VO is maintained constantly.

Figure 4:
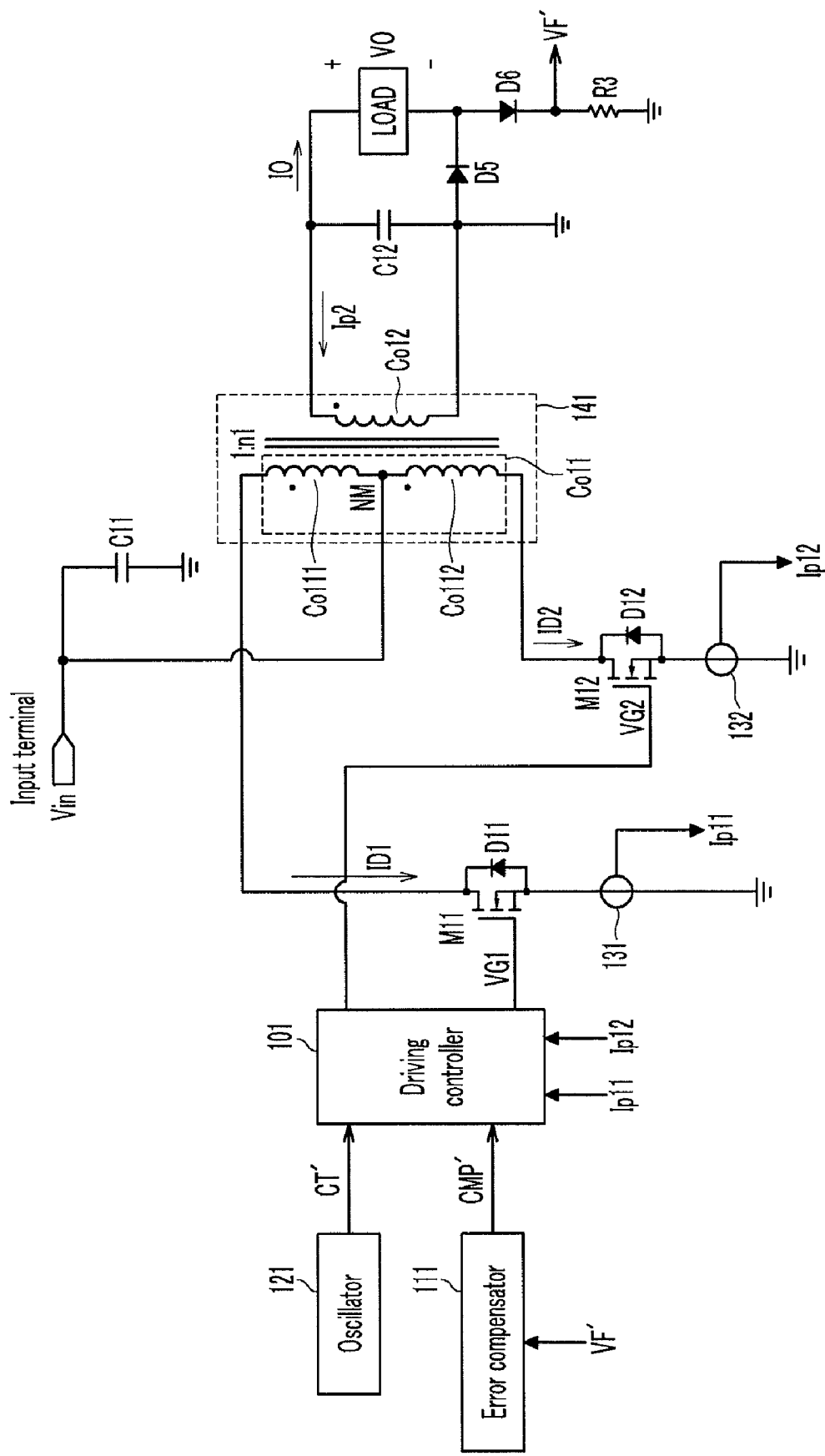
FIG. 4 shows an inverter according to another exemplary embodiment of the present invention.

FIG. 4 shows an inverter according to another exemplary embodiment of the present invention. According to another exemplary embodiment of the present invention, the inverter is of a push-pull type, not of a half-bridge type. The inverter of the push-pull type includes a first side coil divided into two parts. When a current flows through one part of the first side coil, it does not flow through the other part. The high side switch and the low side switch are respectively coupled to each current sensor. Each of current sensors respectively sense currents flowing through each of the switches. Then, each of current sensors can sense a current flowing through the first side coil. One of the two current sensors senses a current during the dead time. The sensed current is a current flowing through a body diode of one of the first and second switches. According to another exemplary embodiment of the present invention, when a current flows through a body diode of one of the first and second switches during the dead time, the inverter turns on the switch including the body diode through which the current flows. Hereinafter, referring to FIG. 4, this will be described in detail.

As shown in FIG. 4, according to another exemplary embodiment of the present invention, the inverter includes a driving controller 101, an error compensator 111, an oscillator 121, current sensors 131 and 132, a transformer 141, a first switch M11, a second switch M12, diodes D5 and D6, and capacitors C11 and C12.

The first switch M11 and the second switch M12 of the inverter are realized as n-channel metal-oxide semiconductor field-effect transistors (NMOSFET). The first switch M11 and the second switch M12 respectively include a body diode D11 and a body diode D12, as well as a drain electrode, a source electrode, and a gate electrode as a first electrode, a second electrode, and a control electrode. The capacitor C11 filters noise of an input voltage Vin.

The transformer 141 includes a first side coil Co11 and a second side coil Co12. The first side coil Co11 is divided into a coil Co11 and a coil Co112. The coil Co111 are electrically connected with the coil Co112 and they are divided by a middle node NM connected to an input terminal. The input voltage Vin is applied to the middle node NM of the first side coil Co11. A voltage at both terminals of the first side coil Co11 is inducted to both terminals of the second side coil Co12 according to a winding ratio 1:n1 between the first side coil Co11 and the second side coil Co12 of the transformer 141. Additionally, according to the winding ratio, a current flowing through the coil Co111 and the coil Co112 is inducted to the second side coil Co12 and a current Ip2 is determined according to the inducted current.

A diode D6 rectifies a current flowing through the LOAD, and a voltage generated when the rectified current flows through a resistor R3 is a feedback voltage VF'. The output current IO flows through a diode D5 when the output current IO is supplied to the LOAD in the negative direction (i.e., opposite direction to arrow of the output current IO shown in FIG. 4). The drain electrode of the first switch M11 is coupled to a first terminal of the first side coil Co11, the source electrode thereof is grounded, and the gate electrode thereof is coupled to the driving controller 101.

A gate control signal VG1 transmitted from the driving controller 101 alternately has a high level and a low level, the high level is sufficient to turn on the first switch M11, and the low level is sufficient to turn off the first switch M11. The drain electrode of the second switch M12 is coupled to a second terminal of the first side coil Co11, the source electrode thereof is grounded, and the gate electrode of the second switch M12 is coupled to the driving controller 101. A gate control signal VG2 transmitted from the controller 101 alternately has a high level and a low level, the high level is sufficient to turn on the second switch M12, and the low level is sufficient to turn off the second switch M12.

The current sensor 131 and the current sensor 132 respectively sense currents flowing through the first and second switches M11 and M12. When the first switch M11 is turned on or the body diode D11 is turned on, the current sensor 131 senses a current ID1, generates a detection signal Ip11 corresponding to the sensed current, and transmits the detection signal Ip11 to the driving controller 101. When the second switch M12 is turned on or the body diode D12 is turned on, the current sensor 132 senses a current ID2, generates a detection signal Ip12 corresponding to the sensed current, and transmits the detection signal Ip12 to the controller 101.

The oscillator 121 generates and outputs a sawtooth wave signal CT' having a predetermined period. In this time, the predetermined period determines a period of each switching operation of the first switch M11 and the second switch M12. The period of switching operation of the first switch M11 and the period of switching operation of the second switch M12 are the same. According to another exemplary embodiment of the present invention, a period of the sawtooth wave signal CT' is the same as the half-period of the switching operation of the first switch M11 and the second switch M12. That is, each switching operation period of the first switch M11 and the second switch M12 can be controlled by using the period of the sawtooth wave signal CT'.

The error compensator 111 receives a feedback signal VF', compares the feedback signal VF' and a reference signal, amplifies a difference according to a comparison result, and generates an error amplification signal CMP'. The reference signal determines duties of the first switch M11 and the second switch M12. The error compensator 111 generates the error amplification signal CMP' in the direction where the difference between the feedback signal VF' and the reference signal is reduced.

Particularly, when the feedback signal VF' is less than the reference signal, the error amplification signal CMP' is increased. Then, a necessary time when the sawtooth wave CT' reaches the error amplification signal CMP' is increased, and the duties are increased. When the duties are increased, an output voltage and an output current are increased and the feedback signal VF' is increased. Then, the difference between the feedback signal VF' and the reference signal is reduced.

When the feedback signal VF' is larger than the reference signal, the error amplification signal CMP' is reduced. Then, a necessary time when the sawtooth wave CT' reaches the error amplification signal CMP' is reduced, and the duties are reduced. When the duties are reduced, the output voltage and the output current are reduced, and the feedback signal VF' is reduced. Then, the difference between the feedback signal VF' and the reference signal is reduced.

The driving controller 101 compares the sawtooth wave signal CT' and the error amplification signal CMP' and generates the gate control signals VG1 and VG2 of the first switch M11 and the second switch M12. Each switching operation period and each duty of the first switch M11 and the second switch M12 are the same. The driving controller 101 alternately turns on the first switch M11 and the second switch M12 and controls to not have a period when the first switch M11 and the second switch M12 are simultaneously turned on.

In a prior inverter of the push-pull type, there is the dead time between on time of the first switch M11 and on time of the second switch M12. Both switches are in the turned-off state during the dead time. However, according to another exemplary embodiment of the present invention, during the dead time, the driving controller 101 senses a current flowing through one of the body diodes D11 and D12 by using the detection signals Ip11 and Ip12, and turns on a one of the first switch M11 and the second switch M12 coupled to one of the body diodes D11 and D12 through which the current flows during the dead time. During the dead time, when sensing the current flowing through the body diode D11, the driving controller 101 turns on the first switch M11. When the current flowing through the first switch M11 is reduced and is near 0, the driving controller 101 turns off the first switch M11. In addition, when the driving controller 101, during the dead time, senses the current flowing through the body diode D12, the driving controller 101 turns on the second switch M12. When the current flowing through the second switch M12 is reduced and is near 0, the driving controller 101 turns off the second switch M12.

The driving controller 101 can set a dead time by using the sawtooth wave signal CT' and the error amplification signal CMP'. In detail, the driving controller 101 can set the dead time by adding a predetermined delay period to the period when the sawtooth wave signal CT' is larger than the error amplification signal CMP'.

According to another exemplary embodiment of the present invention, operation of the push-pull type inverter will be described referring to FIG. 5.

Figure 5:
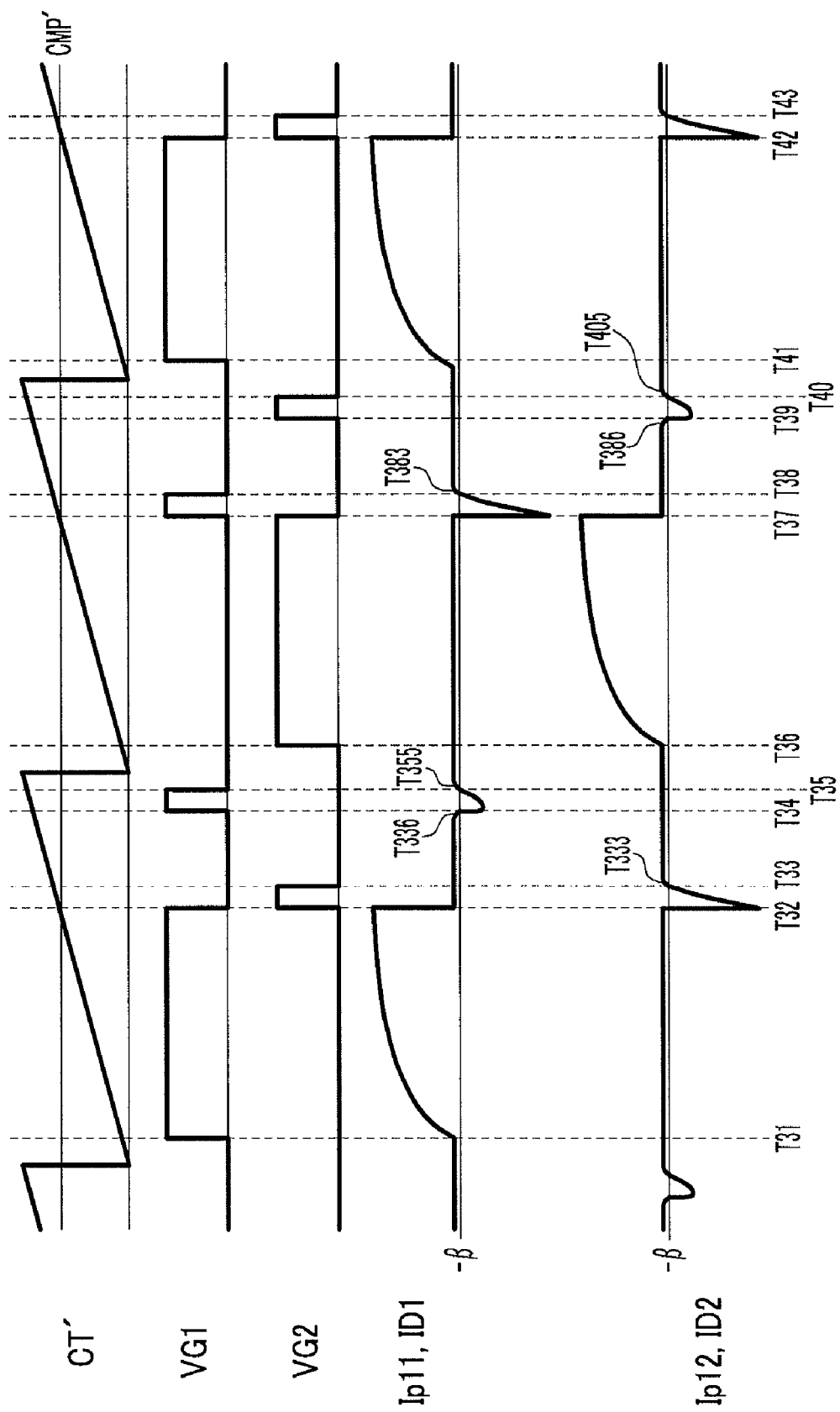
FIG. 5 shows currents and signals flowing through an inverter according to another exemplary embodiment of the present invention.

FIG. 5 shows currents Ip11, Ip12, ID1, an ID2 and signals CT', VG1, and VG2 of the inverter according to another exemplary embodiment of the present invention.

At time T31, when the gate control signal VG1 becomes a high level, the transistor M11 is turned on and the current ID1 flows through the turned-on transistor M11. The current sensor 131 senses the current ID1 and generates the current Ip11. According to another exemplary embodiment of the present invention, the current sensors 131 and 132 are set to generate a current that is the same as the sensed current. Accordingly, the current ID1 and the current Ip11 are the same and the current ID2 and the current Ip12 are the same.

When the first switch M11 is turned on during T31-T32, the current ID1 flows through the path configured with the input terminal, the coil Co111, and the first switch M11, and the current ID1 is increased. At the time T32, when the sawtooth wave signal CT' reaches the error amplification signal CMP', the gate control signal VG1 becomes a low level and the transistor M11 is turned off.

The current ID1 having been flowing through the coil Co111 during T31-T32 is maintained for a predetermined period from the time T32. However, the transistor M11 is turned off at the time T32, so the current ID2 begins to flow through the path that includes the body diode D12 and the coil Co112 by being influenced by the current ID1 during T31-T32. A direction from the drain electrode of the transistor M12 to the source electrode of the transistor M12 is set as a positive direction, and a direction from the source electrode of the transistor M12 to the drain electrode of the transistor M12 is set as a negative direction. The current ID2 is a negative peak at the time T32 and is increased after the time T32. When the driving controller 101 compares a negative threshold value $-\beta$ and the current Ip12 and the condition 3) is met, the driving controller 101 turns on the transistor M12.

The condition 3) is "error amplification signal CMP'<sawtooth wave signal CT' and current Ip12<negative threshold value $-\beta$".

Accordingly, during T32-T33, the driving controller 101 generates the high level gate control signal VG2 and turns on the transistor M12. Then, the current ID2 flows through the turned-on transistor M12 instead of the body diode D12. At the time T33, when the current Ip12 reaches the negative threshold value $-\beta$, the driving controller 101 generates the low level gate control signal VG2 and turns off the transistor M12. Then, the current ID2 flows through the body diode D12.

From time T333, the body diode D12 is turned off and the current Ip12 is "0". At time T336, the current ID1 flows along the path that includes the coil Co111 and the body diode D11. A direction from the drain electrode of the transistor M11 to the source electrode of the transistor M11 is the positive direction, and a direction from the source electrode of the transistor M11 to the drain electrode of the transistor M11 is the negative direction. The current ID1 flows in the negative direction during T336-T355. When the driving controller 101 compares a negative threshold value −β and the current Ip11 and condition 4) is met, the driving controller 101 turns on the transistor M11.

The condition 4) is "error amplification signal CMP'<sawtooth wave signal (CT') and current Ip11<negative threshold value −β". Accordingly, during T34-T35, the driving controller 101 generates the high level gate control signal VG1 and turns on the transistor M11. Then, the current ID1 flows through the turned-on transistor M11 instead of the body diode D11 at time T34. At the time T35, when the current Ip11 reaches the negative threshold value −β, the driving controller 101 generates the low level gate control signal VG1 and turns off the transistor M11. Then, the current ID1 flows through the body diode D11. From time T355, the body diode D11 is turned off and the current Ip11 is 0.

Thus far, since the direction from the drain electrodes of the transistor M11 and the transistor M12 to the source electrodes thereof is set as a positive direction, the currents ID1 and ID2 and the currents Ip11 and Ip12 are described as negative currents when the current flows through the body diodes D11 and D12. However, the invention is not limited to the disclosed embodiments.

During the dead time, when the absolute value of currents flowing through the body diodes D11 and D12 are larger than the threshold value β, the conditions 3) and 4) can be met. That is, the conditions 3) and 4) can be denoted as the following conditions 5) and 6).

Condition 5)
"error amplification signal CMP'<sawtooth wave signal CT' and absolute value of current Ip12>threshold value β"

Condition 6)
"error amplification signal CMP'<sawtooth wave signal CT' and absolute value of current Ip11>threshold value (β)"

The driving controller 101 generates the high level gate control signal VG2 and turns on the transistor M12 at time T36 when a predetermined period is delayed from the time the sawtooth wave signal CT' begins to be increased. At the time T36, when the gate control signal VG2 becomes a high level, the transistor M12 is turned on and the current ID2 flows through the turned-on transistor M12. The current sensor 132 senses the current ID2 and generates the current Ip12. When the second switch M12 is turned on during T36-37, the current ID2 flows through the path configured with the input terminal, the coil Co112, and the second switch M12, and the current ID2 is increased.

At the time T37, when the sawtooth wave signal CT' reaches the error amplification signal CMP', the gate control signal VG2 becomes low level, and the transistor M12 is turned off. Then, the current Ip12 does not flow. The current ID2 having been flowing through the coil Co112 during T36-T37 is maintained for a predetermined period from the time T37. However, the transistor M12 is turned off at the time T37.

Therefore, the current ID1 begins to flow through the path that includes the body diode D11 and the coil Co111 by being influenced by the current ID2 during T36-T37. At the time T37, the current ID11 flows in the negative direction. The current ID1 becomes a negative peak at the time T37 and increases after the time T37. When the driving controller 101 compares the negative threshold value −β and the current Ip11 and meets the condition 4), the driving controller 101 turns on the transistor M12. Accordingly, during T37-T38, the driving controller 101 generates the high level gate control signal VG1 and turns on the transistor M11. Then, the current ID1 flows through the turned-on transistor M11 instead of the body diode D11.

At the time T38, when the current Ip11 reaches the negative threshold value −β, the driving controller 101 generates the low level gate control signal VG1 and turns off the transistor M11. Then, the current ID1 flows through the body diode D11. From time T383, the body diode D11 is turned off and the current Ip11 is 0.

At time T386, the current ID2 flows through the path that includes the coil Co112 and the body diode D12. During the times T386 to T405, the current ID2 flows in the negative direction. When the driving controller 101 compares the negative threshold value −β and the current Ip12 and the condition 3) is met, the driving controller 101 turns on the transistor M12. Accordingly, during T39-T40, the driving controller 101 generates the high level gate control signal VG2 and turns on the transistor M12. Then, the current ID2 flows through the turned-on transistor M12 instead of the body diode D12.

At the time T40, when the current Ip12 reaches the negative threshold value −β, the driving controller 101 generates the low level gate control signal VG2 and turns off the transistor M12. Then, the current ID2 flows through the body diode D12. From the time T405, the body diode D12 is turned off and the current Ip12 is 0.

After time T41, the switching operations of the first and second switches M11 and M12 during the times T31 to T41 are repeated.

As described above, according to another exemplary embodiment of the present invention, to reduce power consumption generated from the body diodes D11 and D12, the inverter senses a current flowing through one of the body diodes D11 and D12, and turns on a switch of the transistors M11 and M12 coupled to one of the body diode D11 and D12 through which the current flows during the dead time.

The negative threshold value −β is set near 0 for zero voltage switching and zero current switching of the switches M11 and M12. That is, since the current flows through the body diodes D11 and D12 when the transistors M11 and M12 are turned on, the transistors M11 and M12 can be turned on according to the zero voltage switching operation.

In addition, when the transistors M11 and M12 are turned off, since an absolute value of the negative threshold value −β is substantially very near 0, the transistors M11 and M12 can be turned off according to the zero current switching operation.

Next, a lamp driver including the inverter according to another exemplary embodiment of the present invention will be described. The lamp driver according to another exemplary embodiment of the present invention is a driver for lighting at least one lamp by using the above-described inverter. It will be described that the lamp driver has four lamps connected to the output terminal. However, the present invention is not limited thereto.

Figure 6:
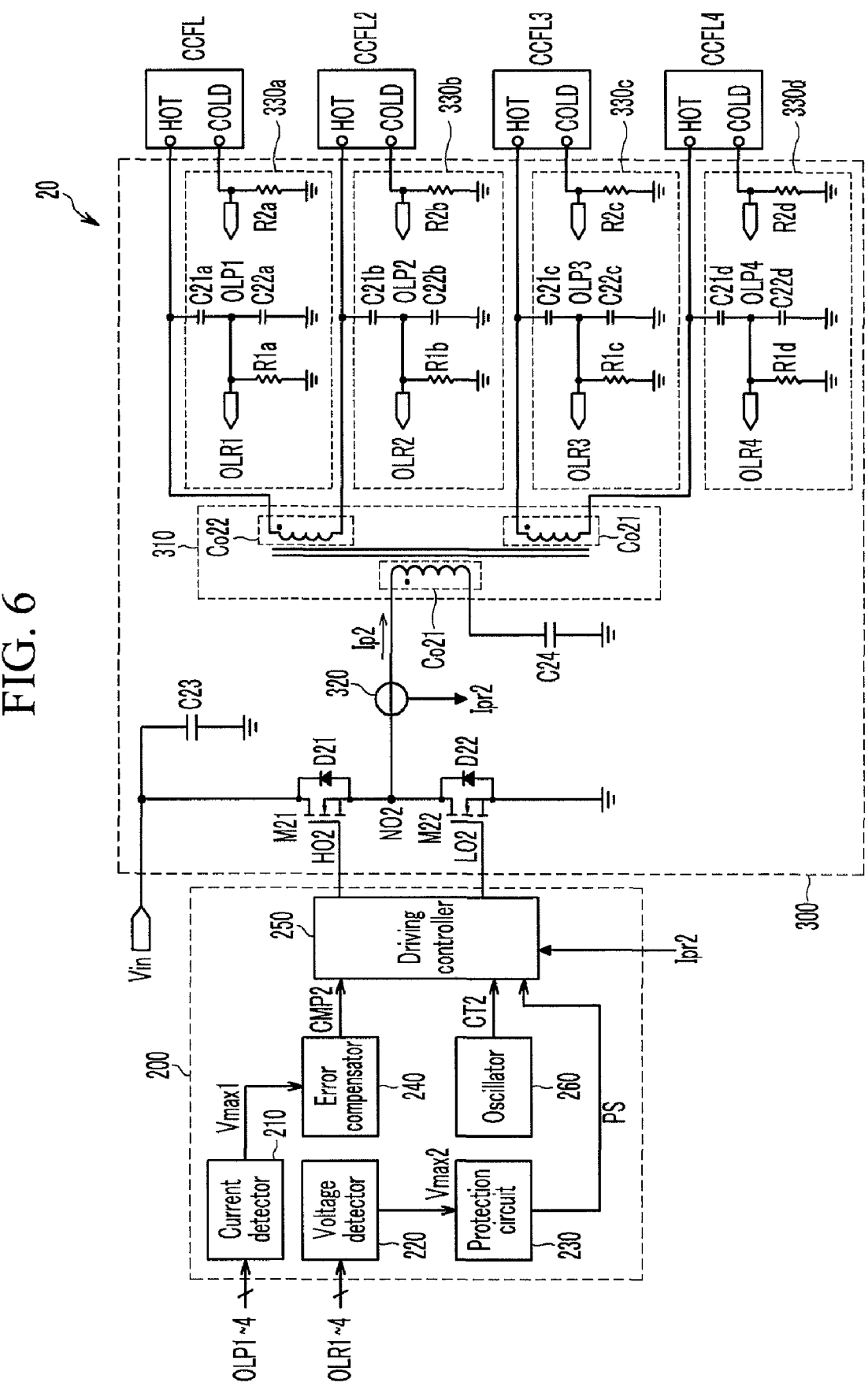
FIG. 6 shows a lamp driver according to another exemplary embodiment of the present invention.

FIG. 6 shows the lamp driver 20 according to another exemplary embodiment of the present invention.

In FIG. 6, the lamp driver 20 includes an inverter of the half-bridge type. However, the present invention is not limited to the type, and the above-described inverter of the push-full type can be used. According to another exemplary embodiment of the present invention, the lamp driver uses a high side switch M21 and a low side switch M22 as NMOS-FETs.

As shown in FIG. 6, the lamp driver 20 includes a controller 200 and a driver 300. The driver 300 is coupled to discharge lamps CCFL1 to CCFL4 and supplies electrical power thereto.

The controller 200 controls switching operations of the high side switch M21 and the low side switch M22 and the electrical power supplied to the discharge lamps CCFL1 to CCFL4. The controller 200 receives feedback information regarding driving currents that flow through the discharge lamps CCFL1 to CCFL4 and driving voltages that are supplied to the discharge lamps CCFL1 to CCFL4, and controls the switching operation and a protection operation of the lamp driver. Also, the controller 200 senses a current that flows through one of the body diodes D21 and D22 and turns on a switch coupled to the body diode through which the current flows.

The driver 300 changes a DC input voltage Vin to an AC output voltage according to the switching operations of the high side switch M21 and the low side switch M22, and transmits the AC output voltages to the discharge lamps CCFL1 to CCFL4. The driver 300 includes the high side switch M21, the low side switch M22, a transformer 310 configured with a first side coil Co21 and second side coils Co22 and Co23, a current sensor 320, capacitors C23 and C24, and feedback units 220a to 220d.

The capacitor C23 filters a noise element of the input voltage Vin.

A drain electrode of the high side switch M21 is coupled to an input terminal and receives the input voltage Vin. A source electrode of the high side switch M21 is coupled to a drain electrode of the low side switch M22. A node NO2 connected with the high side switch M21 and the low side switch M22 is coupled to the transformer 310. A control electrode of the high side switch M21 is coupled to the controller 200. A gate control signal HO2 transmitted from the controller 200 alternately has a high level and a low level. The high level is sufficient to turn on the high side switch M21 and the low level is sufficient to turn off the high side switch M21. A source electrode of the low side switch M22 is grounded. A gate electrode of the low side switch M22 is coupled to the controller 200. A gate control signal LO2 transmitted from the controller 200 alternately has a high level and a low level. The high level is sufficient to turn on the low side switch M22 and the low level is sufficient to turn off the low side switch M22. A first terminal of the first side coil Co21 of the transformer 310 is coupled to the node NO2 and a second terminal of the first side coil Co21 of the transformer 310 is coupled to a first terminal of the capacitor C24. A second terminal of the capacitor C24 is grounded.

A voltage at both terminals of the first side coil Co21 is applied to both terminals of the second side coil Co22 according to a first winding ratio of the second side coil Co22 to the first side coil Co21. The voltage at both terminals of the first side coil Co21 is applied to both terminals of the second side coil Co23 according to a second winding ratio of the second side coil Co23 to the first side coil Co21.

A current flowing through the first side coil Co21 is applied to the second side coil Co22 in inverse proportion to the first winding ratio. The current flowing through the first side coil Co21 is applied to the second side coil Co23 in inverse proportion to the second winding ratio.

The current sensor 320 senses a current Ip2 flowing through the first side coil Co21 of the transformer 310. The current sensor 320 senses the current Ip2, generates a detection signal Ipr2 corresponding the current Ip2, and transmits the detection signal Ipr2 to the controller 200. According to an exemplary embodiment of the present invention, the detection signal Ipr2 is set as the same signal of the current Ip2.

The discharge lamps CCFL1 to CCFL4 respectively include a first terminal HOT and a second terminal COLD. The first terminal HOT of the discharge lamp CCFL1 is coupled to a first terminal of the second side coil Co22 of the transformer 310, and the first terminal HOT of the discharge lamp CCFL2 is coupled to a second terminal of the second side coil Co22 of the transformer 310. The first terminal HOT of the discharge lamp CCFL3 is coupled to a first terminal of the second side coil Co23 of the transformer 310, and the first terminal HOT of the discharge lamp CCFL4 is coupled to a second terminal of the second side coil Co23 of the transformer 310. Each of the second terminals COLD of the discharge lamps CCFL1 to CCFL4 are connected to ground through the corresponding resistors R2a to R2d.

A driving voltage and a driving current generated from the second side coils Co22 is supplied to the discharge lamps CCFL1 and CCFL2, and a driving current generated from the second side coils Co23 is supplied to the discharge lamps CCFL3 and CCFL4.

The feedback units 330a to 330d generate first feedback voltages corresponding to the driving voltages of the discharge lamps CCFL1 to CCFL4, and feed back the first feedback voltages to the controller 200. The feedback units 330a to 330d generate second feedback voltages corresponding to the driving currents of the discharge lamps CCFL1 to CCFL4, and feed back the second feedback voltages to the controller 200.

The feedback unit 330a includes capacitors C21a and C22a and resistors R1a and R2a. The capacitors C21a and C22a are connected between the first terminal HOT of the discharge lamp CCFL1 and the ground terminal in series, and a node of two capacitors C21a and C22a is coupled to a feedback terminal OLR1 of the controller 200.

The driving voltage supplied to the first terminal HOT is divided by the capacitors C21a and C22a, and the divided voltage is the first feedback voltage corresponding to the driving voltage of the discharge lamp CCFL1. The exemplary embodiment of the invention uses the capacitors C21a and C22a for generating the first feedback voltage, but the present invention is not limited thereto. The present invention may use resistors connected between the first terminal HOT and the ground in series instead of the capacitors C21a and C22a. The resistor R1a connects between the ground and a node connected to two capacitors C21a and C22a.

The resistor R2a connects between the second terminal COLD of the discharge lamp CCFL1 and the ground. A node between the second terminal COLD of the discharge lamp CCFL1 and the resistor R2a is coupled to the feedback terminal OLP1 of the controller 200. Accordingly, the second feedback voltage corresponding to the driving current that flows through the discharge lamp CCFL1 is input to the feedback terminal OLP1 of the controller 200.

The feedback units 330b, 330c, and 330d respectively include capacitors C21b and C22b, C21c and C22c, and C21d and C22d, as well as resistors R1b and R2b, R1c and R2c, and R1d and R2d. The feedback units 330b, 330c, and 330d generate the first and second feedback voltages as with the feedback unit 330a. Thus, detailed descriptions will be omitted. The feedback units 330b, 330c, and 330d are respectively coupled to the discharge lamps CCFL2, CCFL3, and CCFL4. Each of nodes between two capacitors C21b and C22b, C21c and C22c, and C21d and C22d is coupled to each of the feedback terminals OLR2, OLR3, and OLR4.

In addition, each of nodes between each second terminal COLD of discharge lamps CCFL2, CCFL3, and CCFL4 and each resistor R2b, R2c, and R2d is coupled to each feedback terminal OLP2, OLP3 and OLP4 of the controller 200. Voltages input to the feedback terminals OLP1 to OLP4 are defined as first feedback voltages. The first feedback voltages correspond to the currents flowing through the discharge lamps CCFL1 to CCFL4.

Voltages input to the feedback terminals OLR1 to OLR4 are second feedback voltages. The second feedback voltages correspond to the driving voltages supplied to the discharge lamps CCFL1 to CCFL4.

The controller 200 includes a current detector 210, a voltage detector 220, a protection circuit 230, an error compensator 240, a driving controller 250, and an oscillator 260.

The current detector 210 rectifies the first feedback voltages, detects a maximum value Vmax1 of rectified first feedback voltages, and transmits the maximum value Vmax1 to the error compensator 240.

The voltage detector 220 rectifies the second feedback voltages, detects a maximum value Vmax2 of the rectified second feedback voltages, and transmits the maximum value Vmax2 to the protection circuit 230.

The protection circuit 230 determines that a protection operation is needed when the maximum value Vmax2 is more than a predetermined value. Then, the protection circuit 230 generates a protection signal PS, and transmits it to the controller 250. When the maximum value Vmax2 is more than the predetermined value, an overvoltage is applied to the discharge lamps CCFL1 to CCFL4. This causes damage to the discharge lamps CCFL1 to CCFL4. The protection circuit 230 generates the protection signal PS to prevent the damage.

The error compensator 240 receives the maximum value Vmax1, and generates an average voltage of the maximum value Vmax1. The error compensator 240 amplifies the difference between the average voltage of the maximum value Vmax1 and a reference signal having a predetermined level, and generates an error amplification signal CMP2. The error compensator 240 can be the same circuit as described in FIG. 3.

The oscillator 260 generates a sawtooth wave signal CT2 having a predetermined period and outputs the sawtooth wave signal CT2. The predetermined period of the sawtooth wave signal CT2 controls periods of the high side switch M21 switching operation and the low side switch M22 of each switching operation.

The driving controller 250 compares the sawtooth wave signal CT2 with the error amplification signal CMP2, and generates gate control signals HO2 and LO2 of the high side switch M21 and the low side switch M22 according to the result of comparing. The period and duty of the high side switch M21 switching operation are the same as those of the low side switch M22 switching operation.

The driving controller 250 alternately turns on the high side switch M21 and the low side switch M22, so controls the high side switch M21 and the low side switch M22 to not be turned on at the same time. The high side switch M21 and the low side switch M22 are turned off during the dead time between a period when the high side switch M21 is turned on and a period when the low side switch M22 is turned on.

The driving controller 250 senses a current flowing through the body diode D21 or the body diode D22 by using the sawtooth wave signal CT2, the error amplification signal CMP2, and the detection signal Ipr2 in the dead time. Then, the driving controller 250 turns on one of the high side switch M21 and the low side switch M22 corresponding to one of the body diode D21 and the body diode D22 that the current flows through. The driving controller 250 senses a current flowing through the body diode D21 in the dead time, and turns on the high side switch M21. Then, the driving controller 250 senses that the current is near 0, and turns off the high side switch M21. The driving controller 250 senses a current flowing through the body diode D22 in the dead time, and turns on the high side switch M22. Then, the driving controller 250 senses that the current is near 0, and turns off the high side switch M22.

The driving controller 250 receives the protection signal PS, generates gate control signals HO2 and LO2 to turn off the high side switch M21 and the low side switch M22, and transmits gate control signals HO2 and LO2 to gate electrodes of the high side switch M21 and the low side switch M22.

The lamp driver according to another exemplary embodiment of the present invention can decrease power consumption caused by a body diode formed in a switching element.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An inverter, comprising:
a first switch having a first body diode;
a second switch having a second body diode;
a transformer including a first side coil in which a first current and a first voltage are generated according to switching operations of the first switch and the second switch and a second side coil having a predetermined winding ratio with respect to the first side coil; and
a controller for controlling each switching operation of the first switch and the second switch,
wherein the controller turns on one of the first switch and the second switch corresponding to one of the first body diode and the second body diode, and a current flows through the first switch and the second switch during a dead time.

2. The inverter of claim 1, further comprising a capacitor including a first terminal coupled to the first side coil and a grounded second terminal,
wherein a first terminal of the first switch is coupled to a first terminal of the second switch, an input voltage is input to a second terminal of the first switch, and a first terminal of the first side coil is coupled to a node connected with the first switch and the second switch.

3. The inverter of claim 2, further comprising
a current sensor coupled to the first terminal of the first side coil.

4. The inverter of claim 2, wherein the controller includes:
an oscillator for generating a sawtooth wave signal having a predetermined period;
an error compensator for receiving a feedback voltage corresponding to output power generated according to a voltage and a current inducted to the second side coil, comparing the feedback voltage with a reference signal, and generating an error amplification signal according the comparing result; and
a driving controller for controlling switching operation of the first switch and the second switch by using the sawtooth wave signal, a current flowing through the first side coil, and the error amplification signal.

5. The inverter of claim 4, wherein the error compensator includes:

an error amplifier having an inversion terminal receiving the feedback voltage and a non-inversion terminal receiving the reference signal; and a capacitor of which both terminals are respectively coupled with an output terminal of the error amplifier and the inversion terminal.

6. The inverter of claim 4, wherein the driving controller turns on the first switch when a current flowing through the first side coil flows through the first body diode during the dead time, and turns on the second switch when the current flowing through the first side coil flows through the second body diode during the dead time.

7. The inverter of claim 6, wherein the driving controller turns on one of the first switch and the second switch at a time that is delayed by a predetermined period from a time when the sawtooth wave signal begins to increase, and turns off the turned-on switch at a first time when the sawtooth wave signal increases to the error amplification signal.

8. The inverter of claim 6, wherein the driving controller turns on the second switch during a period when the sawtooth wave signal is larger than the error amplification signal and the current flowing through the first side coil is larger than a first threshold value, and turns on the first switch during a period when the sawtooth wave signal is larger than the error amplification signal and the current flowing through the first side coil is less than a second threshold value.

9. The inverter of claim 8, wherein the first threshold value is a positive value near 0 and the second threshold value is a negative value near 0.

10. The inverter of claim 1, wherein a first terminal of the first switch is coupled to the first side coil, a first terminal of the second switch is coupled to a second terminal of the first side coil, and an input voltage is applied to any one of node between the first side coils.

11. The inverter of claim 10, further comprising a first current sensor coupled to the second terminal of the first switch and a second current sensor coupled to the second terminal of the second switch.

12. The inverter of claim 10, wherein the controller includes:

an oscillator for generating a sawtooth wave signal having a predetermined period;

an error compensator for receiving a feedback voltage corresponding to an output power generated according to a voltage and a current inducted to the second side coil, comparing the feedback voltage with a reference signal, and generating an error amplification signal according to the comparison result; and a driving controller for controlling switching operation of the first switch and the second switch by using the sawtooth wave signal, the current flowing through the first body diode, the current flowing through the second body diode, and the error amplification signal.

13. The inverter of claim 12, wherein the driving controller turns on the first switch when the current flows through the first body diode during the dead time, and turns on the second switch when the current flows through the second body diode during the dead time.

14. The inverter of claim 13, wherein the driving controller turns on one of the first switch and the second switch at a time that is delayed by a predetermined period from a time when the sawtooth wave signal begins to increase, and turns off the turned-on switch at a first time when the sawtooth wave signal increases to the error amplification signal.

15. The inverter of claim 13, wherein the driving controller turns on the first switch during a period when the sawtooth wave signal is larger than the error amplification signal and an absolute value of the current flowing through the first body diode is larger than a threshold value, and turns on the second switch during a period when the sawtooth wave signal is larger than the error amplification signal and an absolute value of the current flowing through the second body diode is larger than the threshold value.

16. The inverter of claim 15, wherein the threshold value is a positive value near 0.

17. A lamp driver for supplying an output voltage and an output current to discharge lamps, comprising:

a first switch having a first body diode;

a second switch having a second body diode;

a transformer including a first side coil generating a first current and a first voltage according to switching operations of the first switch and the second switch and a second side coil having a predetermined winding ratio with respect to the first side coil; and a controller for controlling each switching operation of the first switch and the second switch, wherein the controller turns on one of the first switch and the second switch corresponding to one of the first body diode and the second body diode, and a current flows through the first switch and the second switch during a dead time, and the lamp driver supplies an output voltage and an output current respectively corresponding to a voltage and a current inducted to the second side coil to a plurality of the discharge lamps.

18. The lamp driver of claim 17, wherein the controller receives a plurality of feedback voltages corresponding to the output currents supplied to the plurality of discharge lamps and a current flowing through the first and second body diodes, and controls the switching operations of the first switch and the second switch by using a sawtooth wave signal having a predetermined period, the plurality of feedback voltages, and the current.

19. The lamp driver of claim 18, wherein the controller includes:

an oscillator for generating the sawtooth wave signal;

a current detector for rectifying the plurality of feedback voltages and detecting a maximum value of rectified first feedback voltages, an error compensator for comparing the maximum value and a predetermined reference signal and generating an error amplification signal according to the comparison result; and a driving controller for controlling switching operation of the first switch and the second switch by using the sawtooth wave signal, the current flowing, and the error amplification signal.

20. The lamp driver of claim 19, wherein the error compensator includes:

an error amplifier having an inversion terminal receiving the maximum value and a non-inversion terminal receiving the reference signal; and a capacitor of which both terminals are respectively coupled with an output terminal of the error amplifier and the inversion terminal.

* * * * *